Patented Dec. 5, 1950

2,532,340

UNITED STATES PATENT OFFICE 2,532,340

2-TRIHALOMETHYL-1,3-DIOXOLANE-4-CARBOXYLIC ACIDS AND DERIVATIVES THEREOF

Elmer F. Schroeder, Chicago, Ill., assignor to G. D. Searle & Co., Skokie, Ill., a corporation of Illinois No Drawing. Application January 28, 1948, Serial No. 4,930

12 Claims. (Cl. 260—338)

This invention relates to 1,3-dioxolane derivatives having in the 2-position a trihalomethyl group and in the 4-position a carboxyl group or related radical derived from a carboxyl group, and to processes for preparing the same. In particular it relates to compounds having the general structural formula

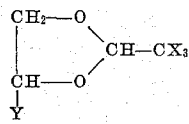

wherein X is a halogen of the group consisting of chlorine and bromine and Y is a carboxyl, ester, or amide group.

In the foregoing structural formula, X represents a halogen such as bromine or chlorine. Y represents a carboxyl group or radicals derived therefrom, such as an amide or ester group. The group Y may be represented as

—CO—Z where Z is OH, $NH_2$, NHR, $NR_2$ or OR, R being an alkyl, hydroxyalkyl, or aralkyl radical, such as methyl, ethyl, propyl, hydroxyethyl, hydroxypropyl, benzyl, and related radicals. When Z represents OH, the compound is a carboxylic acid and is therefore soluble in dilute solutions of bases, forming clear solutions which are nearly neutral and which are stable over long periods of time. The carboxylic acids readily form salts with organic and inorganic bases, which salts can generally be isolated in pure form.

Salts of acidic compounds of the formula

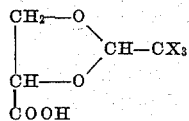

wherein X is a halogen of the group consisting of chlorine and bromine, can be prepared in a purified state by solution of said acidic substance in an alcoholic solution of a base, followed by precipitation of the desired salt by the addition of an alcohol-soluble solvent in which the salt is only slightly soluble. Among such solvents are ethers, hydrocarbons, halogenated hydrocarbons, and esters of lower fatty acids. Among the bases which can be used are sodium hydroxide, potassium hydroxide, sodium alkoxides, potassium alkoxides, methylamine, ammonia, diethylamine, propylamine, trimethylamine, diethanolamine, diethylaminoethanol, morpholine and related alcohol-soluble bases. Salts can also be obtained in dry, pure form by dissolving the acidic compound of the foregoing formula in alcohol or other water-miscible solvent and adding an equivalent of an aqueous or alcoholic solution of a base and evaporating the resulting solution to dryness, preferably under reduced pressure. Bases which are suitable for this purpose include ammonia, aliphatic amines, low-molecular weight heterocyclic amines, alkalies and the like. The salts of the foregoing acids are therefore suitable for parenteral administration in aqueous solution.

The compounds to which this invention relates are prepared from a 2-trihalomethyl-4-hydroxymethyl-1,3-dioxolane by oxidation of the hydroxymethyl group to a carboxyl group by means of common oxidizing agents such as potassium permanganate, chromic anhydride, sodium dichromate in acid solution, nitric acid, and the like. The esters may be prepared from the carboxylic acid by one of the general esterification procedures, as for example, reaction with an anhydrous alcohol in the presence of sulfuric or hydrochloric acid. Esters can also be obtained by conversion of the carboxylic acid to the corresponding acid halide by reaction with an agent such as phosphorus pentachloride, phosphorus oxychloride, phosphorus tribromide, thionyl chloride, and related agents, and reacting the acid halide so obtained with an anhydrous alcohol. Amides can be formed by reacting the foregoing acid halides with ammonia or amines, either in the presence of water or under anhydrous conditions, with or without an inert solvent. Among amines which are used in preparing my compounds are the lower alkyl and dialkyl amines such as methylamine, dimethylamine, n-butylamine, diethylamine, isopropylamine and the like. Alkanolamines such as ethanolamine, diethanolamine, isopropanolamine and related hydroxyalkylamines are among the preferred basic substances for amide formation. Aralkylamines such as benzylamine, phenethylamine and naphthylmethylamine also form amides with desirable properties.

The following compounds are illustrative of the substances within the scope of this application.

A. 2 - trichloromethyl-1,3-dioxolane-4-carboxylic acid, having the formula

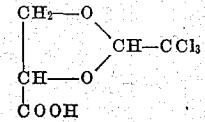

B. 2 - tribromomethyl-1,3-dioxolane-4-carboxylic acid, of the formula

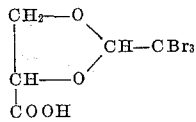

C. Butyl 2 - trichloromethyl-1,3-dioxolane-4-carboxylate, having the formula

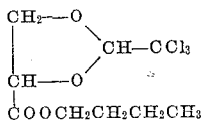

D. Benzyl 2 - tribromomethyl - 1,3 - dioxolane-4-carboxylate, of the formula

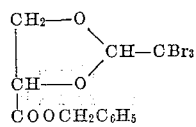

E. N-β-hydroxyethyl-2-tribromomethyl - 1,3 - dioxolane-4-carboxylamide, of the formula

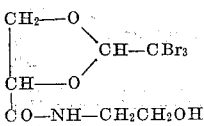

F. N - isopropyl-2-tribromomethyl-1,3-dioxolane-4-carboxyl-amide, having the structure

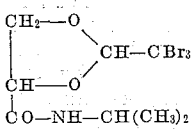

G. N,N-bis-β-hydroxyethyl- 2 - trichloromethyl-1,3-dioxolane-4-carboxylamide, of the formula

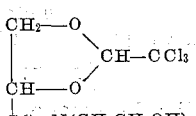

H. Ethyl 2-trichloromethyl-1,3-dioxolane-4-carboxylate, which has the formula

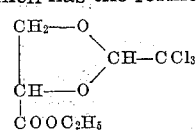

I. 2-trichloromethyl-1,3-dioxolane - 4 - carboxylamide, having the formula

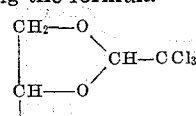

The substances to which this invention relates are generally useful as hypnotics and sedatives. They have the property of depressing the central nervous system and are therefore useful in pharmaceutical preparations. Certain of the compounds are effective both by parenteral and oral routes and others are active orally. Many of them are of value as disinfectants.

My invention is further disclosed by the following examples which are provided for the purpose of illustration and which are not intended in any way to limit this invention in spirit or in scope. Quantities of materials are given in parts by weight.

*Example 1*

10 parts of 2-trichloromethyl-4-hydroxymethyl-1,3-dioxolane are covered with a solution of 1.5 parts of sodium hydroxide in 50 parts of water. The mixture is stirred, and a solution of 15 parts of potassium permanganate in 300 parts of water is added over a period of 70 minutes, the temperature being maintained at 35-45° centigrade. After standing overnight, the reaction mixture is filtered to remove manganese dioxide. The filter cake is washed with 100 parts of boiling water, and the combined filtrates are acidified with hydrochloric acid and evaporated at 100° C. to above one-twelfth its volume. The concentrated solution is made alkaline with sodium bicarbonate solution and extracted twice with methylene chloride. The aqueous solution is boiled to expel methylene chloride and is subsequently acidified with hydrochloric acid. After standing, an oily precipitate forms which solidifies upon chilling. This precipitate of 2-trichloromethyl-1,3-dioxolane-4-carboxylic acid (Compound A) crystallizes after agitation with water, and melts at 132-133° C.

*Example 2*

A. A mixture of 10 parts of 2-trichloromethyl-4-hydroxymethyl-1,3-dioxolane and 28 parts of nitric acid (specific gravity 1.42) is gradually heated with steam. When vigorous evolution of NO₂ fumes begins (10 to 15 minutes) the steam is removed. The violent reaction continues for several minutes, then subsides. On standing overnight, 2-trichloromethyl - 1,3 - dioxolane-4-carboxylic acid crystallizes out. The crystals are filtered off on a fritted glass funnel and washed with cold water. To recrystallize, the product is dissolved in 125 parts of hot water, decanted from a small amount of oily material, treated with decolorizing charcoal, and filtered. The product, a high-melting form of 2-trichloromethyl-1,3-dioxolane-4-carboxylic acid (see Example 1) separates in long rods melting at 132-133° C.

B. The nitric acid filtrates from eight oxidations carried out as described above are evaporated to dryness on the steam bath. The syrupy product is evaporated three times more with 200 parts of water to remove nitric acid. After addition of 200 parts of water, the mixture is neutralized with 20 parts of sodium bicarbonate. The solution is extracted with methylene chloride to remove small amounts of insoluble material, then acidified with 24 parts of concentrated hydrochloric acid. The precipitated syrup is taken up in methylene chloride, washed with water, and dried over anhydrous sodium sulfate. On evaporation of the solvent, an oil remains. This solidifies on stirring. It can be recrystallized from six parts of a 1:1 mixture of benzene and petroleum ether (boiling point 30-60° C.). The product, which is a low-melting form of 2-trichloromethyl-1,3-dioxolane-4-carboxylic acid, crystallizes in short, thick prisms, melting sharply at 77-78° C.

*Example 3*

30 parts of 2-trichloromethyl-1,3-dioxolane-4-carboxylic acid (Example 1) are dissolved in 160 parts of absolute ethanol containing 10 parts of concentrated sulfuric acid. The solution is refluxed for 6 hours and then evaporated under vacuum to one-half its volume. 500 parts of water are added, and the mixture is neutralized with about 16 parts of solid sodium bicarbonate. An oil separates which solidifies on stirring.

This solid is separated, washed with water and dried. It is dissolved in 60 parts of hot absolute ethanol, filtered with charcoal, and the filtrate chilled. Crystals of ethyl 2-trichloromethyl-1,3-dioxolane-4-carboxylate (Compound H) separate in the form of prisms or rods, and melt at 51–53° C.

*Example 4*

5 parts of 2-trichloromethyl-1,3-dioxolane-4-carboxylic acid (Example 2B) and 5 parts of phosphorus pentachloride are stirred until the mixture liquefies. It is then heated to a gentle boil for about one minute and allowed to cool slowly to room temperature. The mixture is poured into a solution of 30 parts of 28% ammonia water and 25 parts of ice-cold water. An oil separates which solidifies immediately. The entire mass is chilled to 0° C. and finally filtered. The crystalline 2-trichloromethyl-1,3-dioxolane-4-carboxylamide (Compound I) so obtained is recrystallized from boiling water using decolorizing charcoal, and forms needles melting at 142–143° C.

*Example 5*

10 parts of 2-tribromomethyl-4-hydroxymethyl-1,3-dioxolane suspended in 50 parts of a 3% aqueous solution of sodium hydroxide are stirred vigorously while 300 parts of a 5% aqueous solution of potassium permanganate is added in about one hour, the temperature being kept below 50° C. The clear supernatant liquid is decanted, acidified with hydrochloric acid and evaporated at about 100° C. to about one-tenth its volume. The concentrate is made alkaline and extracted with methylene chloride. The aqueous solution is made strongly acid to precipitate 2-tribromomethyl-1,3-dioxolane-4-carboxylic acid (Compound B) which comes out as a low-melting solid.

*Example 6*

A. To a mixture of 182 parts of chloral hydrate and 553 parts of concentrated sulfuric acid are added during 40 minutes 76 parts of propylene glycol, the temperature being maintained at 10–15° C. After the addition, the reaction mixture is stirred for 2 hours at 0–10° C., then warmed to 25° C. and stirred for an additional 3-hour period. The mass is poured onto 1000 parts of cracked ice. The lower dark oily layer is separated from the aqueous layer. The oil is dissolved in about 500 parts of methylene chloride and washed with water, with dilute bicarbonate solution, and again with water. It is dried with anhydrous sodium sulfate, treated with decolorizing charcoal, and filtered. The methylene chloride is removed under reduced pressure and the residue is distilled. A liquid fraction boiling at 90–92° C. at 17 millimeters' pressure is obtained. On redistillation, this material boils at 89–92° C. at 16 mm. pressure, and is nearly colorless. This material is shown by analysis to be 2-trichloromethyl-4-methyl-1,3-dioxolane.

B. The residue remaining after the distillation of 2-trichloromethyl-4-methyl-1,3-dioxolane becomes partly solid on standing. This is dissolved in 95% alcohol and chilled. Crystals of 2,4-bis-trichloromethyl-6-methyl-1,3,5-trioxepane separate. On further recrystallization from 95% alcohol, the crystals melt at 104–105° C. This compound has the structural formula

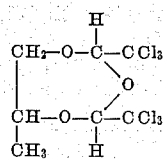

The 1,3-dioxolane and 1,3,5-trioxepane derivatives disclosed in this and subsequent examples are disclosed and claimed in my copending application Serial No. 187,128, filed September 27, 1950.

*Example 7*

A. To a mixture of 182 parts of chloral hydrate and 553 parts of concentrated sulfuric acid cooled to 2° C. are added 90 parts of meso-2,3,-butanediol ($n_D^{25}=1.4362$; $[\alpha]_D^{28}=+0.99°$) during a period of 1 hour, the temperature being kept at 10–12° C. The mixture is stirred at 0–10° C. for 4 hours, then brought to room temperature and stirred for 2 hours. The reaction mixture is poured onto 1000 parts of cracked ice. Upon standing, an oily layer containing a small amount of crystals settles out. The aqueous layer is decanted and the partly crystalline oil is washed with water. The crystals are removed from the oil by decantation and washed with petroleum ether. Upon recrystallization from methyl ethyl ketone these crystals melt at 176–178° C. Analysis indicates that this material is 2,4,-bis-trichloromethyl-6,7-dimethyl-1,3,5-trioxepane. This compound has the structural formula

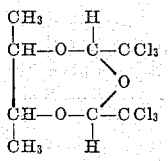

B. The oily fraction is dissolved in about 400 parts of methylene chloride, washed with water, dilute bicarbonate solution, and again with water. The solution is dried with sodium sulfate, filtered, and evaporated under reduced pressure. The residue of 2-trichloromethyl-4,5-dimethyl-1,3-dioxolane is distilled under reduced pressure, and boils at 95–97° C. at 14 mm. pressure.

*Example 8*

182 parts of chloral hydrate are mixed with 553 parts of concentrated sulfuric acid until liquefied. To the chilled mixture are added 104 parts of 1,2-pentadiol over a period of 2 hours, the temperature being maintained at 6–10° C. The reaction mixture is stirred for 3 hours at ice temperature, and 1½ hours at room temperature, then poured onto about 1000 parts of ice. The oily layer which precipitates is separated from the water layer, taken up in methylene chloride, washed with water and bicarbonate solution, dried, and filtered. After the evaporation of the solvent the residue is distilled under reduced pressure and boils at 102–125° C. at 13 mm. pressure. On redistillation, a fraction boiling at 104–106° C. at 11 mm. is obtained. This material is 2-trichloromethyl-4-n-propyl-1,3-dioxolane.

*Example 9*

90 parts of 1,3-butanediol, 182 parts of chloral hydrate, and 553 parts of concentrated sulfuric acid are reacted at low temperature as in Example 8. The reaction mixture is worked up by the method of Example 8. The oily residue of 2-trichloromethyl-4-methyl-1,3-dioxane distills at 120–125° C. at 26 mm. pressure. On redistillation, 2 - trichloromethyl - 4 - methyl-1,3-dioxane boils at 119–121° C. at 25 mm. pressure.

*Example 10*

26 parts of trimethylene glycol, 182 parts of chloral hydrate, and 553 parts of concentrated sulfuric acid are reacted as in Example 8. The oily residue is obtained by the usual procedure (see Example 8). On standing, this oily residue crystallizes. It is dissolved in 4 volumes of warm 75% ethanol, treated with decolorizing charcoal, and filtered. The filtrate is chilled, and platelike crystals of 2-trichloromethyl-1,3-dioxane separate. These melt at 72–74° C.

I claim:

1. A new composition of matter having the structural formula

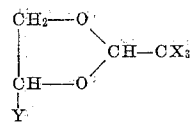

wherein X is halogen of the group consisting of chlorine and bromine and Y is a member of the group consisting of carboxyl, carboxylic acid salt, carboxylic acid amide and carboxylic acid ester radicals.

2. A 2 - trihalomethyl - 1,3 - dioxolane-4-carboxylic acid, wherein the halogen is a member of the group consisting of chlorine and bromine, and salts thereof.

3. 2-tribromomethyl - 1,3 - dioxolane - 4 - carboxylic acid and salts thereof.

4. 2-trichloromethyl - 1,3 - dioxolane - 4 - carboxylic acid and salts thereof.

5. A 2-trihalomethyl - 1,3 - dioxolane - 4 - carboxylic acid ester having the structural formula

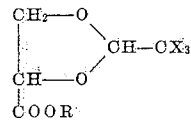

wherein R is hydrocarbon radical of the alkyl and aralkyl series, and X is halogen of the group consisting of chlorine and bromine.

6. A 2-trihalomethyl - 1,3 - dioxolane - 4 - carboxylic acid ester having the structural formula

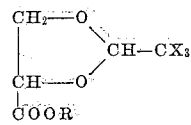

wherein R' is an alkyl radical, and X is halogen of the group consisting of chlorine and bromine.

7. An ethyl 2-trihalomethyl-1,3-dioxolane-4-carboxylate, wherein the halogen is a member of the group consisting of chlorine and bromine.

8. Ethyl 2-trichloromethyl - 1,3 - dioxolane-4-carboxylate.

9. A 2-trihalomethyl - 1,3 - dioxolane - 4 - carboxylic acid amide having the formula

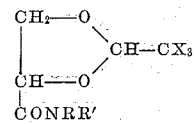

wherein X is halogen of the group consisting of chlorine and bromine and R and R' are members of the group consisting of hydrogen, alkyl and hydroxyalkyl.

10. A 2 - trihalomethyl - 1,3 - dioxolane-4-carboxylamide, which has the formula

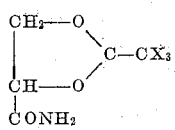

wherein X is halogen of the group consisting of chlorine and bromine.

11. The process of producing a 2-trihalomethyl-1,3-dioxolane-4-carboxylic acid which comprises oxidizing a 2-trihalomethyl-4-hydroxymethyl-1,3-dioxolane with an inorganic oxidizing agent and isolating from the reaction mixture the 2-trihalomethyl-1,3-dioxolane-4-carboxylic acid.

12. The process of producing 2-trichloromethyl-1,3-dioxolane-4-carboxylic acid which comprises oxidizing with nitric acid 2-trichloromethyl-4-hydroxymethyl-1,3-dioxolane and separating said acid from the reaction mixture.

ELMER F. SCHROEDER.

REFERENCES CITED

The following references are of record in the file of this patent:

UNITED STATES PATENTS

| Number | Name | Date |
|---|---|---|
| 2,245,260 | Dickey et al. | June 10, 1941 |